(12) United States Patent
Purintun

(10) Patent No.: US 9,578,972 B2
(45) Date of Patent: Feb. 28, 2017

(54) CHAIR ASSEMBLY

(71) Applicant: Patricia Purintun, Mesa, AZ (US)

(72) Inventor: Patricia Purintun, Mesa, AZ (US)

(*) Notice: Subject to any disclaimer, the term of this patent is extended or adjusted under 35 U.S.C. 154(b) by 0 days.

(21) Appl. No.: 14/719,704

(22) Filed: May 22, 2015

(65) Prior Publication Data

US 2016/0338495 A1 Nov. 24, 2016

(51) Int. Cl.
*A47C 7/72* (2006.01)
*A47B 83/02* (2006.01)
*A47C 7/00* (2006.01)
*H01L 31/042* (2014.01)

(52) U.S. Cl.
CPC ............ *A47C 7/72* (2013.01); *A47B 83/02* (2013.01); *A47C 7/004* (2013.01); *A47C 7/006* (2013.01); *H01L 31/042* (2013.01)

(58) Field of Classification Search
CPC .......... A47C 7/72; A47C 7/004; A47C 7/006; A47B 83/02; H01L 31/042
USPC ..................... 297/162, 171, 217.3
See application file for complete search history.

(56) References Cited

U.S. PATENT DOCUMENTS

| 5,612,718 | A | * | 3/1997 | Bryan | A47C 7/70 |
| | | | | | 297/115 |
| 6,092,868 | A | * | 7/2000 | Wynn | A47C 7/72 |
| | | | | | 297/217.3 |
| 6,145,926 | A | * | 11/2000 | Lin | A47C 7/72 |
| | | | | | 297/217.3 |
| 6,336,681 | B1 | | 1/2002 | Crosbie | |
| 7,134,719 | B2 | * | 11/2006 | Moglin | A47C 7/72 |
| | | | | | 297/217.3 |
| 7,161,490 | B2 | | 1/2007 | Huiban | |
| 7,443,311 | B2 | | 10/2008 | Primak et al. | |
| 8,002,349 | B1 | * | 8/2011 | Pizzuto | A47C 1/143 |
| | | | | | 297/217.3 X |
| 2009/0206641 | A1 | | 8/2009 | Brown, Jr. | |
| 2012/0205951 | A1 | | 8/2012 | Strolka-Echols | |
| 2013/0154315 | A1 | | 6/2013 | Kilzer | |
| 2013/0249256 | A1 | | 9/2013 | Payne, Jr. et al. | |

* cited by examiner

*Primary Examiner* — Anthony D Barfield

(57) ABSTRACT

A chair assembly includes a chair that has a seat, a backrest, a pedestal and a pair of arm rests. A charging unit is attached to the chair and the charging unit may have an external electronic device electrically coupled thereto. A pair of first tables is provided and each of the first tables is movably coupled to the chair. A second table is movably attached to the chair.

13 Claims, 6 Drawing Sheets

CHAIR ASSEMBLY

BACKGROUND OF THE DISCLOSURE

Field of the Disclosure

The disclosure relates to chair devices and more particularly pertains to a new chair device for using solar energy to charge an external electronic device.

Summary of the Disclosure

An embodiment of the disclosure meets the needs presented above by generally comprising a chair that has a seat, a backrest, a pedestal and a pair of arm rests. A charging unit is attached to the chair and the charging unit may have an external electronic device electrically coupled thereto. A pair of first tables is provided and each of the first tables is movably coupled to the chair. A second table is movably attached to the chair.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
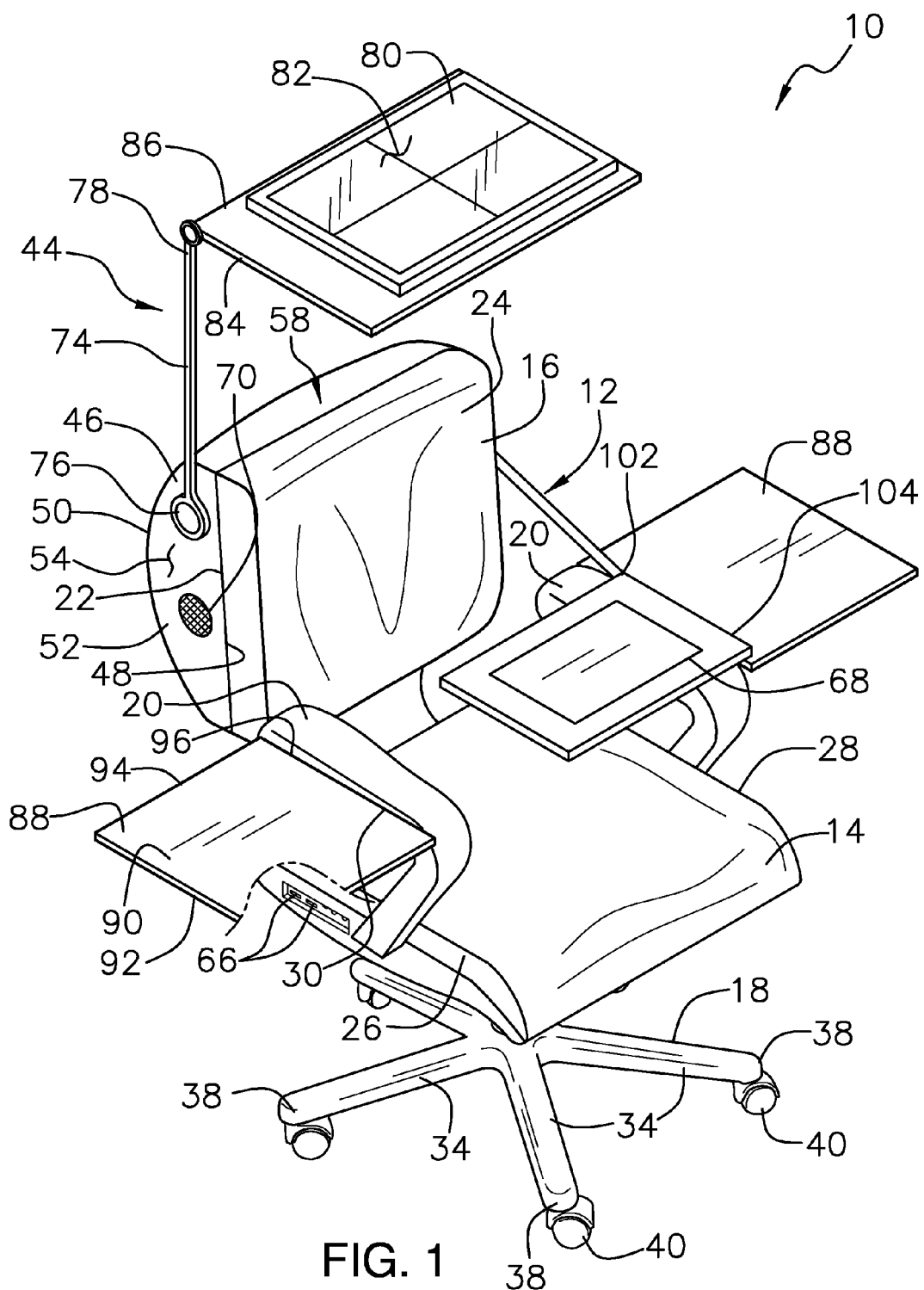
FIG. 1 is a top perspective view of a chair assembly according to an embodiment of the disclosure.
Figure 2:
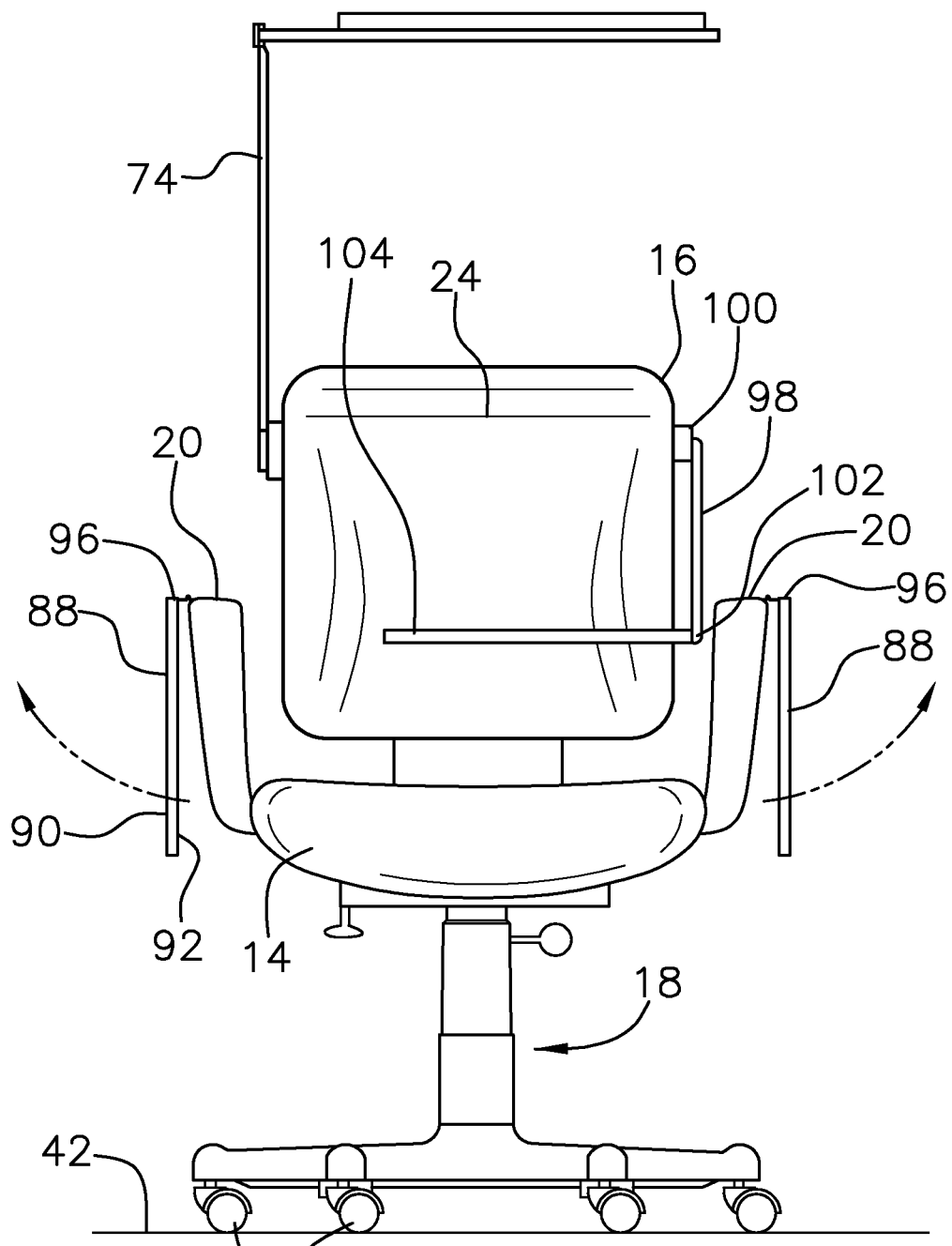
FIG. 2 is a front view of an embodiment of the disclosure.
Figure 3:
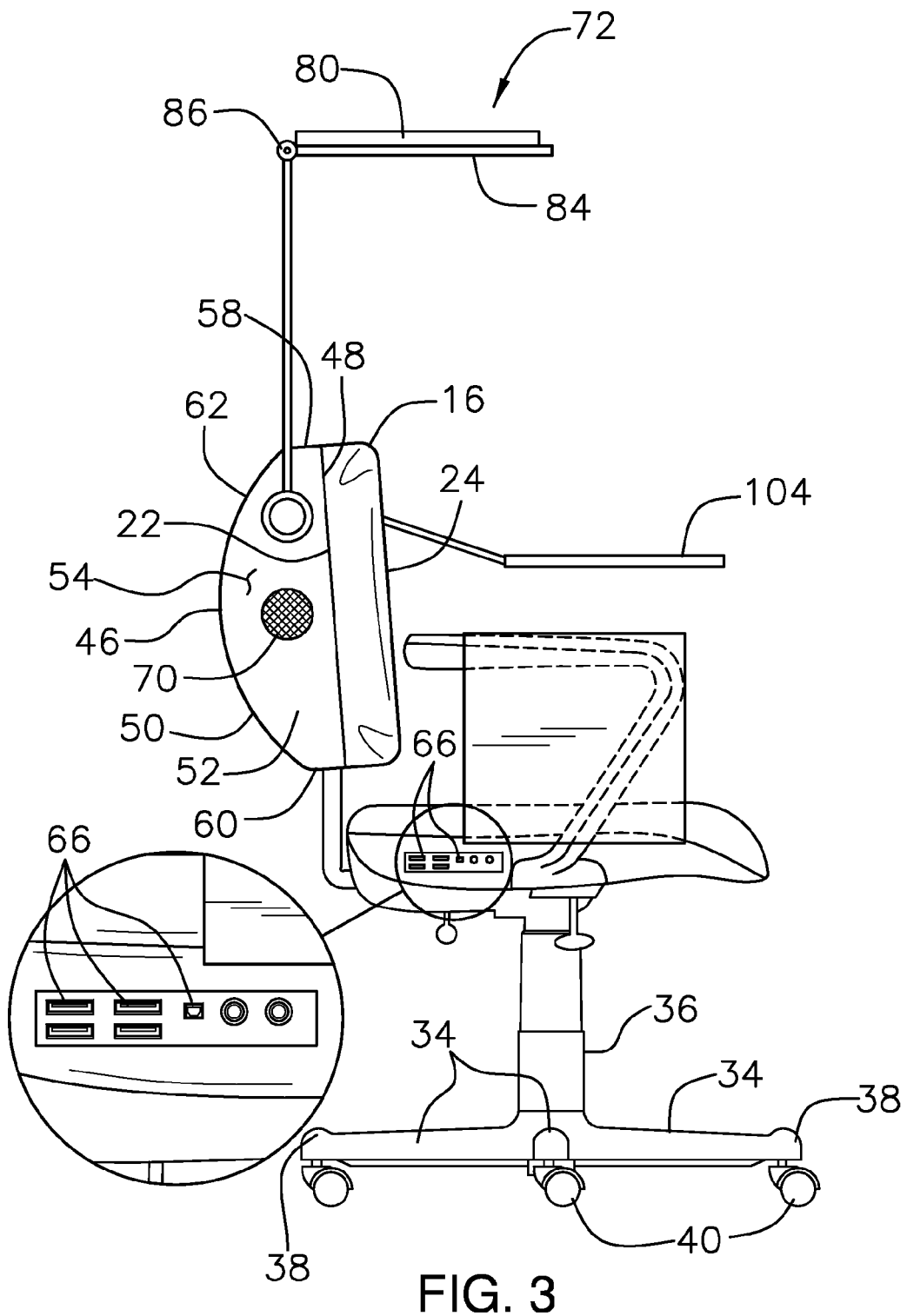
FIG. 3 is a right side view of an embodiment of the disclosure.
Figure 4:
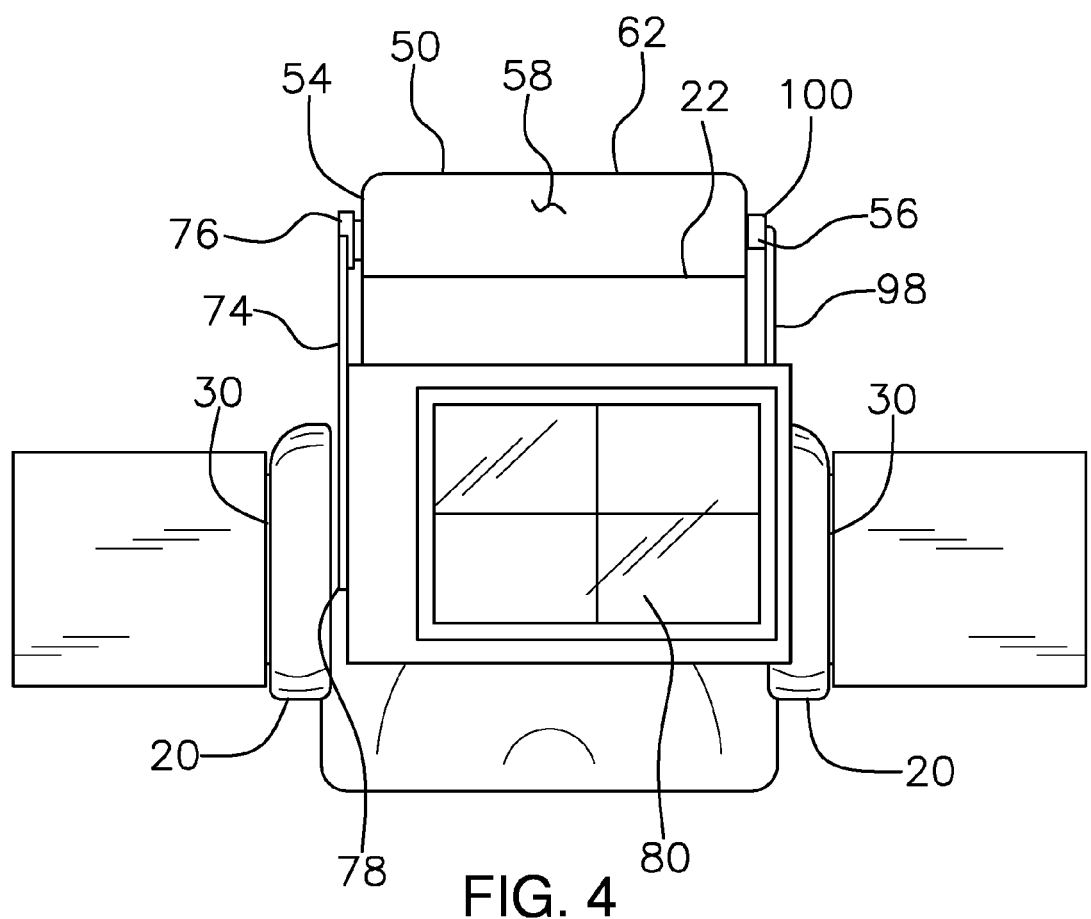
FIG. 4 is a top view of an embodiment of the disclosure.
Figure 5:
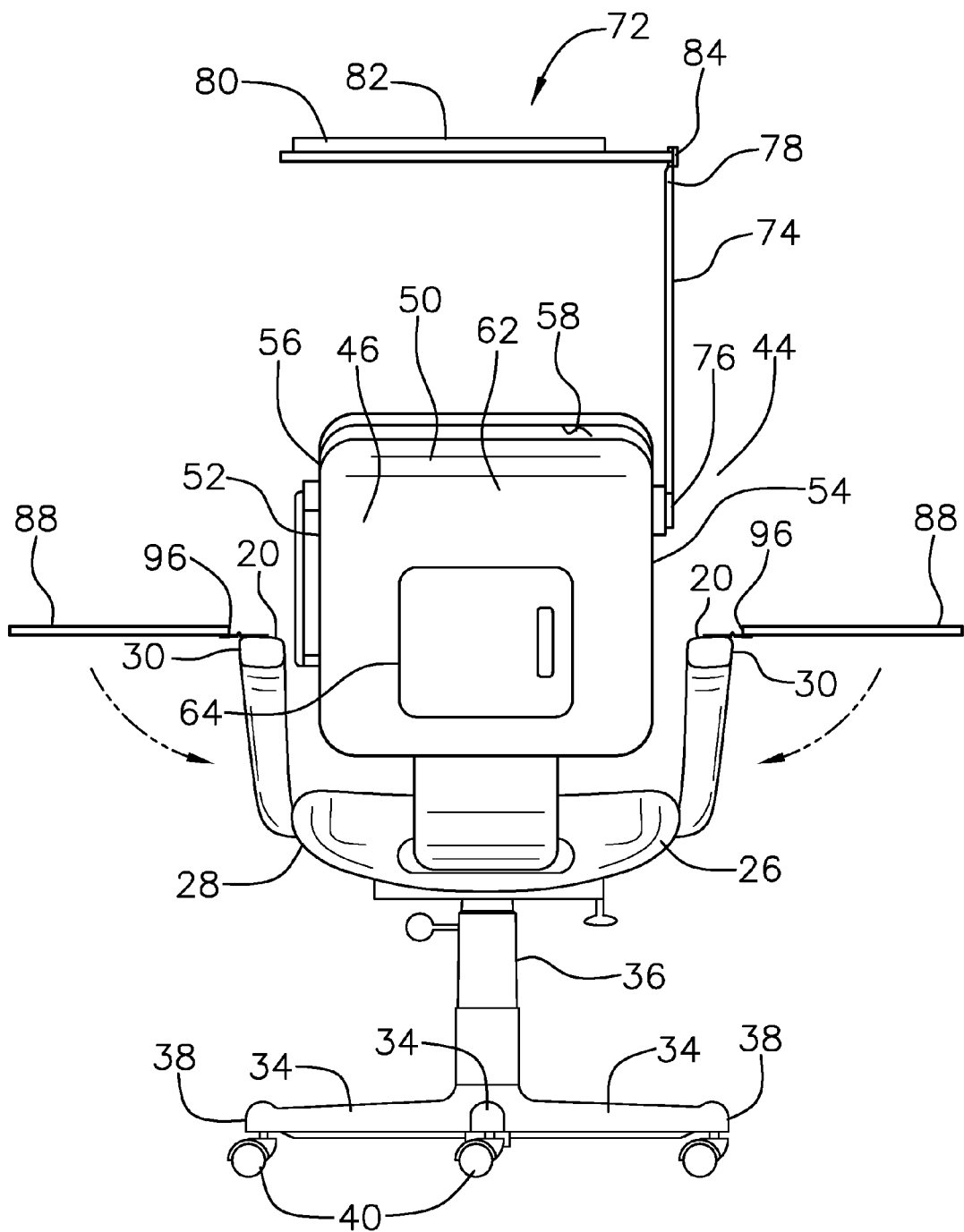
FIG. 5 is a back view of an embodiment of the disclosure.
Figure 6:
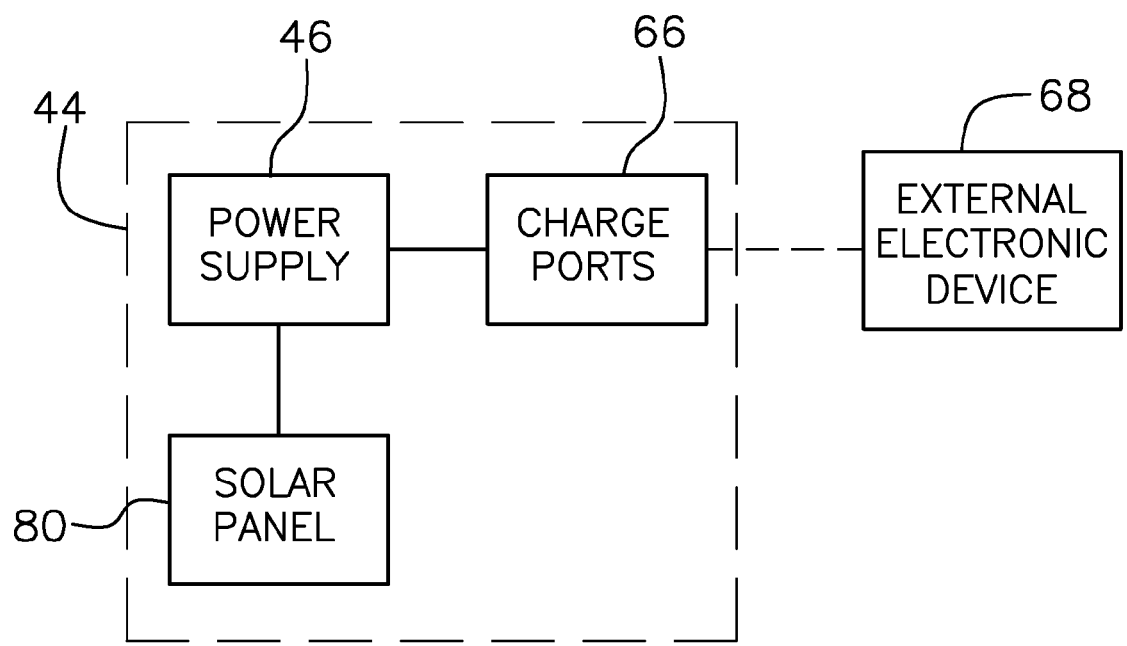
FIG. 6 is a schematic view of an embodiment of the disclosure.

With reference now to the drawings, and in particular to FIGS. 1 through 6 thereof, a new chair device embodying the principles and concepts of an embodiment of the disclosure and generally designated by the reference numeral 10 will be described.

As best illustrated in FIGS. 1 through 6, the chair assembly 10 generally comprises a chair 12 that has a seat 14, a backrest 16, a pedestal 18 and a pair of arm rests 20. The backrest 16 has a back side 22 and a front side 24 and the seat 14 has a first lateral edge 26 and a second lateral edge 28. Each of the arm rests 20 is attached to and extends upwardly from an associated one of the first lateral edge 26 and the second lateral edge 28 and each of the arm rests 20 has an outwardly facing edge 30 with respect to the seat 14. The pedestal 18 comprises a plurality of legs 34 extending outwardly from a central post 36 and each of the legs 34 has a distal end 38 with respect to the central post 36. A plurality of wheels 40 is provided and each of the wheels 40 is rotatably attached to the distal end 38 of an associated one of the legs 34. Each of the wheels 40 may roll along a support surface 42 and the support surface 42 may be ground.

A charging unit 44 is attached to the chair 12 and the charging unit 44 comprises a power supply 46 that has a forward side 48, a rearward side 50 and a peripheral side 52 extending between the forward side 48 and the rearward side 50. The peripheral side 52 has a first lateral surface 54, a second lateral surface 56, a top surface 58 and a bottom surface 60. The forward side 48 is attached to the back side 22 of the backrest 16 and the rearward side 50 is convexly arcuate between the top surface 58 and the bottom surface 60. The power supply 46 comprises at least one battery 62. A battery cover 64 is removably attached to the rearward side 50 and the battery cover 64 is removable to access an interior of the power supply 46.

A plurality of charge ports 66 is provided and each of the charge ports 66 is attached to the seat 14. Each of the charge ports 66 is positioned on the first lateral edge 26 of the seat 14 and each of the charge ports 66 is electrically coupled to the power supply 46. Each of the charge ports 66 may have an external electronic device 68 electrically coupled thereto. The external electronic device 68 may be a personal computer or the like. Additionally, the plurality of charge ports 66 may comprise a USB port, an HDMI port, an Ethernet port or other electronic port conventionally utilized for electronic devices. A pair of speakers 70 is attached to the power supply 46 and the speakers 70 are positioned on an associated one of the first lateral surface 54 and the second lateral surface 56 of the power supply 46. The speakers 70 are electrically coupled to each of the charge ports 66 such that the speakers 70 may be electrically coupled to the external electronic device 68.

A solar unit 72 is movably attached to the power supply 46 and the solar unit 72 is adjustable relative to the chair 12. The solar unit 72 is electrically coupled to the charging unit 44 such that the solar unit 72 charges the power supply 46 and the solar unit 72 converts solar energy into electrical energy. The solar unit 72 comprises a first support 74 that has a first end 76 and a second end 78. The first end 76 is hingedly coupled to the first lateral surface 54 of the power supply 46 and the first support 74 is positionable in an extended position having the first support 74 extending upwardly from the power supply 46. A solar panel 80 is provided that has a top surface 82, a first lateral edge 84 and a back edge 86. The solar panel 80 is hingedly coupled to the second end of the first support 74 such that the second end 78 is positioned at an intersection of the first lateral edge 84 and the back edge 86. The solar panel 80 is electrically coupled to the power supply 46 and the solar panel 80 is positionable in a deployed position having the top surface 82 being exposed to sunlight.

A pair of first tables 88 is provided and each of the first tables 88 has a top side 90, a bottom side 92 and a perimeter edge 94 extending between the top side 90 and the bottom side 92. The perimeter edge 94 of each of the first tables 88 has an inwardly facing surface 96 and the inwardly facing surface 96 of each of the first tables 88 is hingedly coupled to the outwardly facing edge 90 of an associated one of the arm rests 20. Each of the first tables 88 is positionable in a deployed position having the first tables 88 extending laterally away from the associated arm rest 20 thereby facilitating each of the first tables 88 to provide a work surface. Each of the first tables 88 is positionable in a stored position having the first tables 88 extending downwardly from the associated arm rests 20.

A second support 98 is provided that has a first end 100 and a second end 102 and the first end 100 is movably attached to the second lateral surface 56 of the power supply 46. The second support 98 is adjustable with respect to the chair 12. A second table 104 is attached to the second end 102 of the second support 98 and the second table 104 is positionable in front of the chair 12 thereby facilitating the second table 104 to provide a work surface.

In use, the chair 12 is positioned outdoors in order to expose the solar panel 80 to sunlight. Additionally, the chair 12 allows a user to enjoy being outdoors while utilizing the chair 12. The external electronic device 68 is electrically coupled to a selected one of the charge ports 66 and the speakers 70 are utilized to emit audio from the external electronic device 68. The external electronic device 68 is positioned on a selected one of the first tables 88 or the second table 104.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chair assembly configured to provide electrical power for at least one electronic device, said assembly comprising:
    a chair having a seat, a backrest, a pedestal and a pair of arm rests;
    a charging unit being attached to said chair, said charging unit being configured to have an external electronic device electrically coupled thereto;
    a pair of first tables, each of said first tables being movably coupled to said chair;
    a second table being movably attached to said chair; and
    wherein said charging unit comprises a power supply having a forward side, a rearward side and a peripheral side extending between said forward side and said rearward side, said peripheral side having a first lateral surface, a second lateral surface, a top surface and a bottom surface, said forward side being attached to a back side of said backrest, said rearward side being convexly arcuate between said top surface and said bottom surface, said power supply comprising at least one battery.

2. The assembly according to claim 1, wherein said backrest has a back side and a front side, said seat having a first lateral edge and a second lateral edge, each of said arm rests being attached to and extending upwardly from an associated one of said first lateral edge and said second lateral edge, each of said arm rests having an outwardly facing edge with respect to said seat, said pedestal comprising a plurality of legs extending outwardly from a central post, each of said legs having a distal end with respect to said central post.

3. The assembly according to claim 2, further comprising a plurality of wheels, each of said wheels being rotatably attached to said distal end of an associated one of said legs, each of said wheels being configured to roll along a support surface.

4. The assembly according to claim 1, further comprising a battery cover removably attached to said rearward side, said battery cover being removable to access an interior of said power supply.

5. The assembly according to claim 1, further comprising:
    a power supply; and
    a plurality of charge ports, each of said charge ports being attached to said seat, each of said charge ports being positioned on a first lateral edge of said seat, each of said charge ports being electrically coupled to said power supply, each of said charge ports being configured to have the external electronic device electrically coupled thereto.

6. The assembly according to claim 1, further comprising:
    a power supply; and
    a solar unit being movably attached to said power supply, said solar unit being adjustable relative to said chair, said solar unit being electrically coupled to said charging unit such that said solar unit charges said power supply, said solar unit being configured to convert solar energy into electrical energy.

7. The assembly according to claim 1, wherein each of said first tables has a top side, a bottom side and a perimeter edge extending between said top side and said bottom side, said perimeter edge of each of said first tables having an inwardly facing surface, said inwardly facing surface of each of said first tables being hingedly coupled to an outwardly facing edge of an associated one of said arms rests.

8. The assembly according to claim 7, wherein each of said first tables is positionable in a deployed position having said first tables extending laterally away from said associated arm rest thereby facilitating said first tables to provide a work surface, each of said first tables being positionable in a stored position having said first tables extending downwardly from said arm rests.

9. The assembly according to claim 1, wherein a second support having a first end and a second end, said first end being movably attached to said second lateral surface of said power supply, said second support being adjustable with respect to said chair.

10. The assembly according to claim 9, wherein to said second table is movably coupled to said second end of said second support, said second table being positionable in front of said chair wherein said second table is configured to provide a work surface.

11. A chair assembly configured to provide electrical power for at least one electronic device, said assembly comprising:
    a chair having a seat, a backrest, a pedestal and a pair of arm rests;
    a charging unit being attached to said chair, said charging unit being configured to have an external electronic device electrically coupled thereto;
    a pair of first tables, each of said first tables being movably coupled to said chair;
    a second table being movably attached to said chair;
    a power supply;

a solar unit being movably attached to said power supply, said solar unit being adjustable relative to said chair, said solar unit being electrically coupled to said charging unit such that said solar unit charges said power supply, said solar unit being configured to convert solar energy into electrical energy; and wherein said solar unit comprises a first support having a first end and a second end, said first end being hingedly coupled to a first lateral surface of said power supply, said first support being positionable in an extended position having said first support extending upwardly from said power supply.

12. The assembly according to claim 11, wherein a solar panel having a top surface, a first lateral edge and a back edge, said solar panel being hingedly coupled to said second end of said support such that said second end is positioned at an intersection of a first lateral edge and a back edge, said solar panel being electrically coupled to said power supply, said solar panel being positionable in a deployed position having said top surface being exposed to sunlight.

13. A chair assembly configured to provide electrical power for at least one electronic device, said assembly comprising:

a chair having a seat, a backrest, a pedestal and a pair of arm rests, said backrest having a back side and a front side, said seat having a first lateral edge and a second lateral edge, each of said arm rests being attached to and extending upwardly from an associated one of said first lateral edge and said second lateral edge, each of said arm rests having an outwardly facing edge with respect to said seat, said pedestal comprising a plurality of legs extending outwardly from a central post, each of said legs having a distal end with respect to said central post;

a plurality of wheels, each of said wheels being rotatably attached to said distal end of an associated one of said legs, each of said wheels being configured to roll along a support surface;

a charging unit being attached to said chair, said charging unit comprising a power supply having a forward side, a rearward side and a peripheral side extending between said forward side and said rearward side, said peripheral side having a first lateral surface, a second lateral surface, a top surface and a bottom surface, said forward side being attached to said back side of said backrest, said rearward side being convexly arcuate between said top surface and said bottom surface, said power supply comprising at least one battery, a battery cover removably attached to said rearward side, said battery cover being removable to access an interior of said power supply, a plurality of charge ports, each of said charge ports being attached to said seat, each of said charge ports being positioned on said first lateral edge of said seat, each of said charge ports being electrically coupled to said power supply, each of said charge ports being configured to have an external electronic device electrically coupled thereto, a solar unit being movably attached to said power supply, said solar unit being adjustable relative to said chair, said solar unit being electrically coupled to said charging unit such that said solar unit charges said power supply, said solar unit being configured to convert solar energy into electrical energy, said solar unit comprising a first support having a first end and a second end, said first end being hingedly coupled to said first lateral surface of said power supply, said first support being positionable in an extended position having said first support extending upwardly from said power supply, and a solar panel having a top surface, a first lateral edge and a back edge, said solar panel being hingedly coupled to said second end of said support such that said second end is positioned at an intersection of said first lateral edge and said back edge, said solar panel being electrically coupled to said power supply, said solar panel being positionable in a deployed position having said top surface being exposed to sunlight;

a pair of first tables, each of said first tables having a top side, a bottom side and a perimeter edge extending between said top side and said bottom side, said perimeter edge of each of said first tables having an inwardly facing surface, said inwardly facing surface of each of said first tables being hingedly coupled to said outwardly facing edge of an associated one of said arm rests, each of said first tables being positionable in a deployed position having said first tables extending laterally away from said associated arm rest thereby facilitating said first tables to provide a work surface, each of said first tables being positionable in a stored position having said first tables extending downwardly from said arm rests;

a second support having a first end and a second end, said first end being movably attached to said second lateral surface of said power supply, said second support being adjustable with respect to said chair; and a second table attached to said second end of said second support, said second table being positionable in front of said chair wherein said second table is configured to provide a work surface.

* * * * *